Oct. 11, 1966   S. BERNARD   3,277,734
ELECTRIC POWER TAKE-OFF CONTROL
Filed Oct. 15, 1963   2 Sheets-Sheet 1

Severin Bernard
INVENTOR.
BY Clarence A. O'Brien
and Harvey B. Jacobson
Attorneys

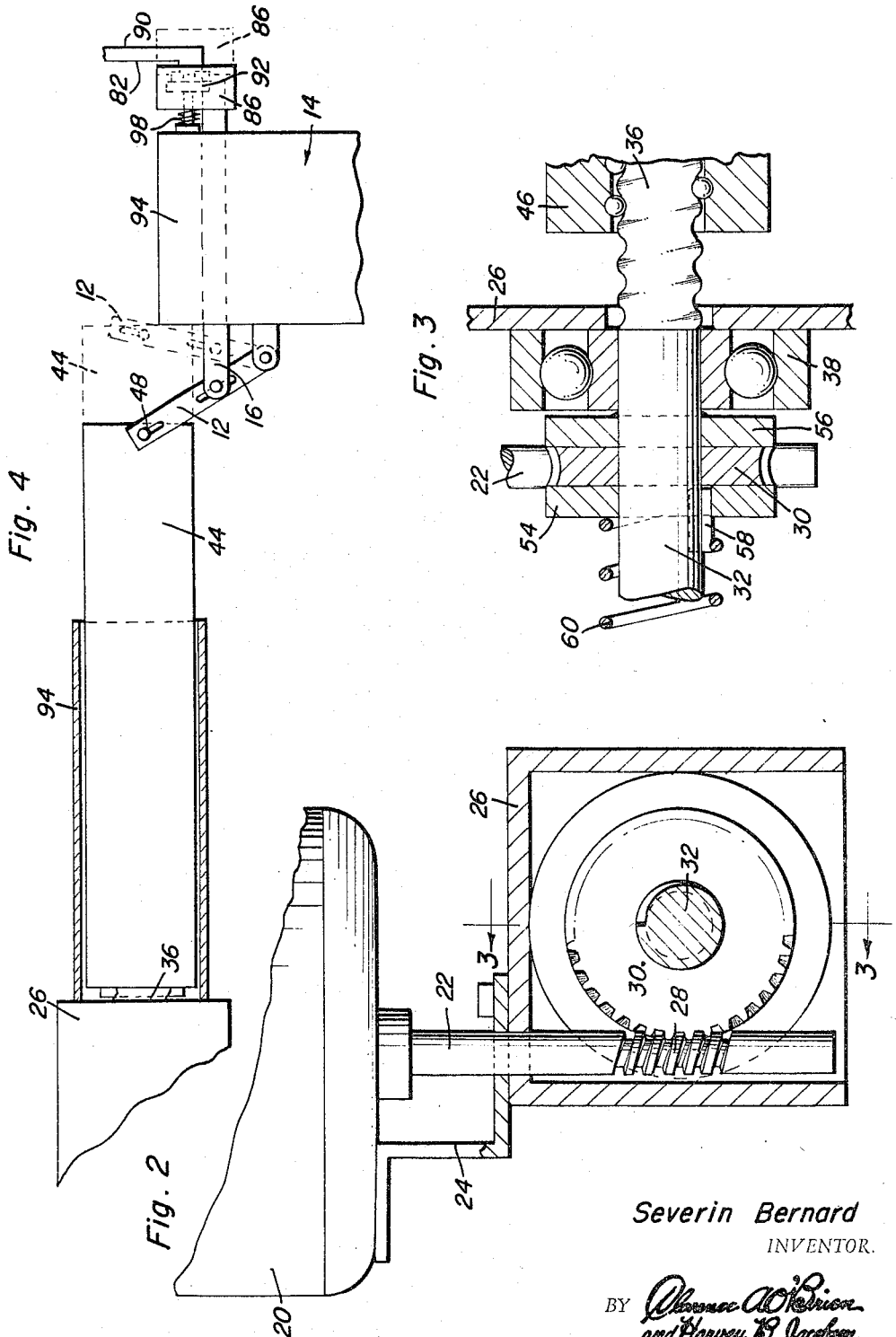

United States Patent Office 3,277,734
Patented Oct. 11, 1966

3,277,734
ELECTRIC POWER TAKE-OFF CONTROL
Severin Bernard, 106 Everett Road, Albany, N.Y.
Filed Oct. 15, 1963, Ser. No. 316,267
6 Claims. (Cl. 74—335)

This invention primarily relates to a control system and mechanism for operating a power take-off device mounted upon a motor vehicle.

Many power take-off attachments are in use today upon motor vehicles. These power take-off attachments are of the general type illustrated by Patent No. 2,100,678 wherein a shiftable gear mounted within the attachment is adapted to be placed in mesh with a gear in the transmission of the motor vehicle for tapping power from the transmission mechanism. The shifting of the gear in the power take-off attachment is usually accomplished by moving a lever which in turn shifts the gear. It is the primary object of this invention to disclose an improved mechanism and means which can be secured to the motor vehicle and attached to the lever on the power take-off attachment for pivoting said lever to shift the gear within the attachment into mesh with the gear in the transmission.

A further object of this invention resides in the combination with the mechanism for shifting the gear of said power take-off attachment of an electrical indicating system connected to the lever means for signalling the mesh of the power take-off gear and power driven gear of the transmission thereby precluding a waste of power and foreclosing the possibility of jamming the power take-off and power driven gears and breaking the same.

Yet another object of this invention resides in the provision of an easily accessible actuating means for actuating the mechanism to shift the gear, said means being readily adapted to be mounted on the dashboard of the motor vehicle.

A still further object of this invention resides in the fact that a minimum number of elements are required to construct the improved mechanism and means for shifting the lever, each of said elements being either readily fabricated or commercially available.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a cross sectional view through the improved mechanism for shifting a power take-off gear and shown connected to the pivotable lever of the power take-off device and further illustrating a schematic wiring diagram illustrating the electrical indicating system for indicating the mesh of the power take-off and power driven gear of the transmission of the vehicle as well as the controls for actuating the improved mechanism.

FIGURE 2 is a cross section view taken substantially along the plane indicated by the line 2—2 of FIGURE 1 and illustrating a portion of the driving connections between some of the elements of the improved mechanism.

FIGURE 3 is a cross sectional view taken substantially along the plane of the line 3—3 of FIGURE 2 illustrating further components of the drive connection.

FIGURE 4 is a fragmentary view partly in side elevation and partly in section illustrating the shifting of the gear in the power take-off device and the actuation of the electrical indicator means for signalling the mesh of the power take-off power driven gears.

Figure 1:
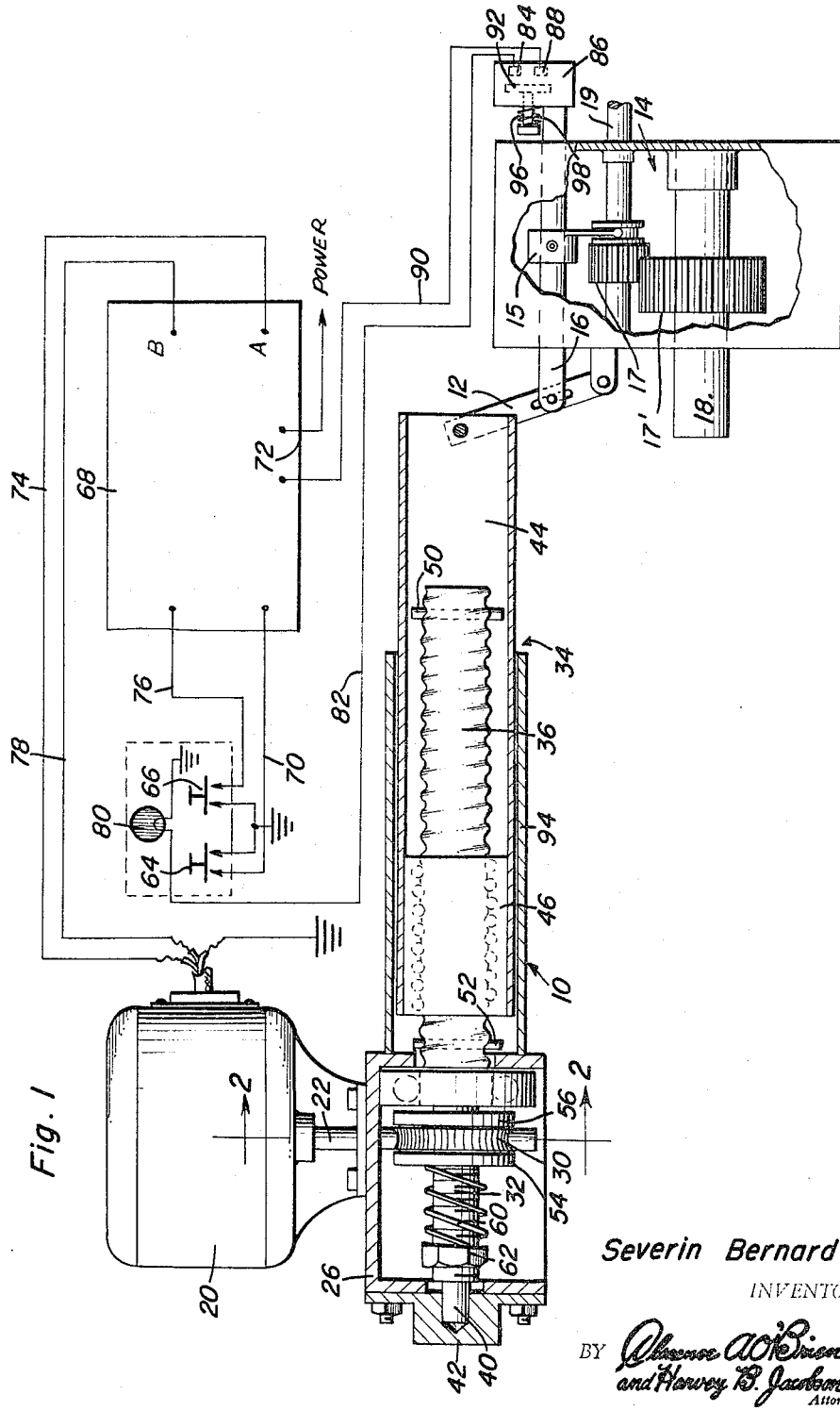

Referring now to the drawings in detail, it will be seen that an improved mechanism and means 10 may be connected to a pivotable lever 12 carried by the housing of a power take-off attachment 14 mounted upon a motor vehicle. The mechanism 10 is adapted to pivot the lever 12 and cause a shaft 16 which mounts a shifting fork 15 to move in an axial direction. The fork 15 is operatively connected to a gear 17 slidably mounted on a driven input shaft 19 of the attachment 14. The gear 17 is shiftable axially into and out of mesh with a gear 17' mounted on the output shaft 18 of the attachment 14 for rotation therewith. The shaft 16, when moved to the left as viewed in FIGURE 2 of the drawings, will shift the power take-off or drive gear 17 into mesh with the power or driven gear 17'. When the gears are in mesh, the input shaft 19 is drivingly coupled to the output shaft 18.

The mechanism 10 includes a reversible electric motor 20 having a rotatable power output shaft 22. Secured to the electric motor 20 by means of a suitable bracket such as 24 is an elongated housing 26 through which the shaft 22 extends. Disposed within the housing 26 and formed on the shaft 22 is a worm 28 meshed with a worm gear 30 freely rotatable upon a shaft extension 32 of an axially shiftable driven shaft assembly generally designated by the numeral 34.

The shaft assembly 34 includes an elongated, rotatable threaded shaft 36 extending through a wall of the housing 26 and terminating in the shaft extension 32. As illustrated more clearly in FIGURE 3, the shaft extension 32 extends through a suitable bearing such as 38 mounted on the wall of the housing 26 and terminates in a diametrically reduced portion 40 rotatably mounted within an end cap 42 secured to an opposite wall of the housing 26. A tubular sleeve 44 has an integral nut assembly 46 secured to the interior thereof with the latter telescopically received over the threaded shaft 36 in threaded engagement therewith. The nut 46 includes a ball bearing assembly having a plurality of races mounting a plurality of ball bearings in encasing relation with the screw threaded shaft 36. The sleeve 44 is pivotably connected as shown at 48 to the lever 12 of the power take-off device. It should thus be evident that upon rotation of the shaft extension 32 through a driving connection established with the worm gear 30, the sleeve 44 will be caused to move axially along the threaded shaft 36 causing pivotable movement of the lever 12 to shift the shaft 16 and cause the power take-off gear 17 to slide into mesh with the power driven gear 17' in the transmission of the vehicle. This action can be reversed by reversing the direction of rotation of the shaft 22 upon reversing the electric motor 20. To complete the shaft assembly 34, a pair of abutment stops 50 and 52 are placed at opposite ends of the threaded shaft 36 to limit the axial reciprocal movement of the nut assembly 46 and therefore sleeve 44 by abutting and contacting the nut assembly 46 when it approaches either end of the threaded shaft 36.

As previously mentioned, the worm gear 30 is freely rotatable upon the shaft extension 32. In order to provide a driving connection between the worm gear 30 and the shaft extension 32, a pair of clutch disks 54 and 56 are secured to the shaft extension 32. The clutch disk 56 is welded or otherwise secured to the shaft extension 32 and abuts one face of the worm gear 30. The clutch disk 54, on the other hand, is keyed to the shaft extension 32 as shown at 58 and is slidable along the extension and into abutting engagement with the opposite face of the worm gear 30. In order to bias the clutch disk 54 into tight frictional engagement with one face of the worm gear 30, a coil spring 60 is wound about the shaft extension 32 and is compressed between the clutch disk 54 and a retaining nut 62 threadedly mounted on the shaft extension 32. The coil spring 60 will normally bias the clutch disk 54 into tight frictional engagement with one face of the worm gear 30 whereby rotation of the worm gear will be imparted to the clutch disks 54 and 56 which in turn will rotate the shaft extension 32 and the threaded shaft 36 to axially reciprocate the sleeve 44 and pivot the lever 12. The reason for providing a driving connection as just described, rather than a direct connection of the worm gear through the shaft extension, is that if the power take-off and power driven gears 17 and 17' do not accurately mesh but jam, continued rotation of the worm gear 30 will have no effect upon the rotation of the threaded shaft 36 since the clutch disks will slip relative to the rotation of the worm gear 30. This will prevent further movement of the sleeve 44 and possible breakage of the gears or jamming thereof.

An electrical control system has been provided whereby the operator of the shifting device may conveniently actuate the reversible motor 20 from the interior of the cab of the vehicle. Referring specifically to FIGURE 1, it will be seen that a pair of push button switches 64 and 66 are adapted to be mounted upon the dash of the vehicle. The closing of the switch 64 is adapted to actuate a relay contained within a box 68 through the line 70. This relay will connect a source of power coming into the box 68 through the line 72 to the point contact designated by the letter A. Power will be supplied from the line 72 through the contact point A and through the line 74 to the electric motor 20 to drive the motor in one direction and thus cause the axial movement of the sleeve 44 in one direction to pivot the lever 12. On the other hand, depression of the push button switch 66 will cause the activation of a second relay through the line 76 which in turn will connect the line 72 to the point contact designated by the letter B. Power will then be supplied to the point contact B through the line 78 to the reversible electric motor 20 to cause the shaft 22 thereof to rotate in an opposite direction. This will correspondingly cause the sleeve 44 to move in an opposite axial direction to either mesh or disengage the power take-off gear 17 as the case may be.

A red light or the like 80 is also adapted to be mounted upon the dash of the motor vehicle for indicating whether or not the power take-off and power driven gears in the transmission of the vehicle are in mesh. If the light goes on, this will be an indication that the gears 17 and 17' are in mesh but if after a protracted period of time after actuation of the motor 20, the light does not go on, this will indicate to the operator that the gears are not in mesh wherein the sleeve 44 must be backed off and the gear 17 in the transmission rotated to a new position and an attempt at mesh must be again tried. As illustrated in FIGURE 1, the light 80 is electrically connected by a conductor 82 to a point contact 84 mounted within a housing 86 connected to the shiftable shaft 16. A second contact 88 is provided within the housing 86 and is electrically connected by means of a conductor 90 to the source of power. A fixed contact element 92 is positioned within the housing 86 attached to the shaft 16 and upon movement of the shaft 16 to the left as viewed in FIGURE 1, which is caused by the lever 12 bringing the power take-off gear 17 into mesh, the contacts 84 and 88 will be brought adjacent the contact element 92. If shifting of the gear 17 into mesh with the gear 17' is complete, contact will be made between the contact element 92 and the contacts 84, 88 to connect the source of power through the conductors 90 and 82 to the light 80. If for some reason, the gears jam or do not properly mesh, the contact element 92 is so positioned with respect to the contacts 84, 88 as not to contact them thereby leaving the circuit to the light 80 open. After a short passage of time, this will indicate to the operator that the gears are not in mesh whereby the operator can prevent any forceful mesh of the gear 17 with the possibility of breakage occurring.

To complete the assembly of the control system, the suitable housing extension 94 is adapted to extend from above the walls of the housing 26. The extension 94 enshrouds the sleeve 44 and acts as a dirt shield to prevent grime and grit as well as dust from entering adjacent the shaft assembly and thus to prevent fouling thereof in operation.

With specific reference now to FIGURE 4, the operation of the device should be readily apparent. Upon actuation of the motor 20 to rotate the shaft 22 in one direction by depressing one of the push button switches 64, 66, a driving connection will be established between the rotatable shaft 22 and the threaded shaft 36 by means of the worm gear 30 and the clutch disks 54 and 56. Upon rotation of the threaded shaft 36, the sleeve 44 will move axially in response thereto to pivot the lever 12 from a position as shown in full lines in FIGURE 4 to the dotted line position. This will move the shaft 16 to the right as viewed in said figure and disengage the power take-off gear 17 from the power driven gear 17' in the transmission. Upon actuation of the other of these switches 64, 66 the direction of rotation of the shaft 22 from the rotor 20 will be reversed whereby the sleeve 44 can be drawn to the left as viewed in FIGURE 4. This will cause the lever 12 to pivot toward its full line position and draw the shaft 16 to the left so that the power take-off gear 17 will be placed in mesh with the power driven gear 17'. If this occurs, the housing 86 will have moved to the full line position shown in FIGURE 4 wherein a plunger 96 carrying the contact element 92 may be slid within the housing 86 against the bias of a spring 98 wound about the plunger into contact with the contact elements 84, 88 to connect the source of electrical energy to energize and light the lamp 80, to indicate that the gears are in mesh. However, if the gears jam or do not mesh, said lamp will not go on. Further, when this condition occurs, the driving connection between the worm gear 30 and the shaft extension 32 will be broken preventing an attempted mesh of the gears and possible breakage thereof. Further, the stops 50, 52 will prevent further movement of the sleeve 44 after mesh or disengagement of the gears.

It should also be apparent that another switch can be located anywhere on the truck to retract the unit so that the operator need not return to the cab.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a power take-off attachment for a motor vehicle including a power take-off gear shiftable into mesh with a power driven gear in said vehicle by means of a pivotable lever carried by the attachment, a control system for pivoting said lever to shift said gears into and out of mesh comprising reversible rotatable shaft means, an operative connection between said shaft means and said lever for pivoting said lever to mesh and disengage said power take-off gear with said power driven gear, said operative connection including an axially shiftable, driven shaft assembly connected to said lever, drive means drivingly connecting said shaft assembly to said rotatable shaft means for imparting reciprocal movement to said shaft assembly upon reversals of rotation of said rotatable shaft means, said drive means including a worm connected to the rotatable shaft means, a worm gear in mesh with said worm freely rotatable upon said shaft assembly, clutch means fixed to said shaft assembly adjacent said worm gear, and means mounted upon said shaft assembly for biasing said clutch means into frictional engagement with said worm gear.

2. The combination of claim 1 wherein said shaft assembly includes an elongated, rotatable threaded shaft connected to said drive means, a tubular sleeve having an integral nut secured to the interior thereof telescopically received over the threaded shaft with the nut in threaded engagement therewith, said sleeve being adapted for connection to said control.

3. The combination of claim 1 wherein said shaft assembly includes an elongated, rotatable threaded shaft connected to said drive means, a tubular sleeve having an integral nut secured to the interior thereof telescopically received over the threaded shaft with the nut in threaded engagement therewith, said sleeve being connected to the pivotable lever, abutment means on opposite ends of said threaded shaft for limiting the movement of said sleeve relative to the shaft.

4. The combination of claim 1 wherein said drive means and shaft assembly are enclosed within a housing, said housing including a shield enshrouding the tubular sleeve.

5. In combination with a power take-off attachment for a motor vehicle including a power take-off gear shiftable into mesh with a power driven gear in said vehicle by means of a pivotable lever carried by the attachment, a control system for pivoting said lever to shift said gear means into and out of mesh comprising, reversible electric motor means having rotatable shaft means, an operative connection between said shaft means and said lever for pivoting said lever to mesh and disengage said power take-off gear with said power driven gear, said operative connection including an axially shiftable, driven shaft assembly connected to said lever, means drivingly connecting said shaft assembly to said rotatable shaft means for imparting reciprocal movement to said shaft assembly upon reversal of rotation of said rotatable shaft means by the reversible motor means, said shaft assembly including an elongated, rotatable threaded shaft connected to said drive means, a tubular sleeve having an integral nut secured to the interior thereof telescopically received over the threaded shaft with the nut in threaded engagement therewith, said sleeve being connected to the pivotable lever, said drive means including a worm connected to the rotatable shaft means, a worm gear in mesh with said worm freely rotatable upon said shaft assembly, clutch means fixed to said shaft assembly adjacent the worm gear and means mounted upon said shaft assembly for biasing said clutch means into frictional engagement with said worm gear.

6. In combination with a power take-off attachment for a motor vehicle including a power take-off gear shiftable into mesh with a power driven gear in said vehicle by means of a pivotable lever carried by the attachment, a control system for pivoting said lever to shift said gears into and out of mesh comprising, reversible electric motor means having rotatable shaft means, an operative connection between said shaft means and said lever for pivoting said lever to mesh and disengage said power take-off gear with said power driven gear, said operative connection including an axially shiftable, driven shaft assembly connected to said lever, drive means drivingly connecting said shaft assembly to said rotatable shaft means for imparting reciprocal movement to said shaft assembly upon reversal of rotation of said rotatable shaft means by the reversible motor means, said drive means including a worm connected to the rotatable shaft means, a worm gear in mesh with said worm freely rotatable upon said shaft assembly, clutch means fixed to said shaft assembly adjacent the worm gear, and means mounted upon said shaft assembly for biasing said clutch means into frictional engagement with said worm gear.

References Cited by the Examiner
UNITED STATES PATENTS

| | | | |
|---|---|---|---|
| 2,489,725 | 11/1949 | Rutemiller | 74—365 |
| 2,660,281 | 11/1953 | Ochtman | 192—141 |
| 2,768,532 | 10/1956 | Russel | 74—425 |
| 3,106,852 | 10/1963 | Miller | 74—365 |

DAVID J. WILLIAMOWSKY, *Primary Examiner.*

H. S. LAYTON, *Assistant Examiner.*